Jan. 26, 1965  F. A. CHIDSEY, JR., ETAL  3,166,879
WRAP-AROUND CARTON LOADER
Filed July 9, 1962  8 Sheets-Sheet 3

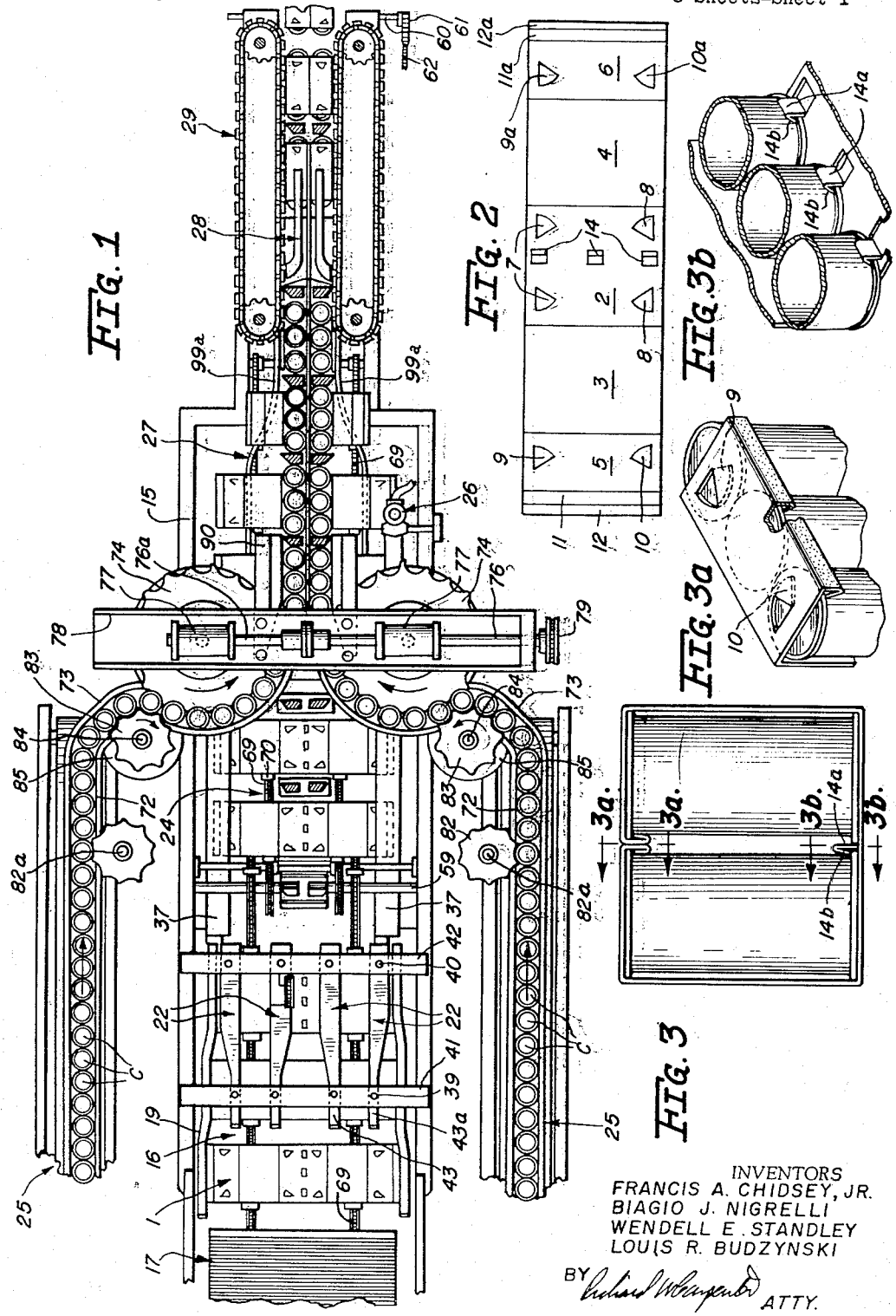

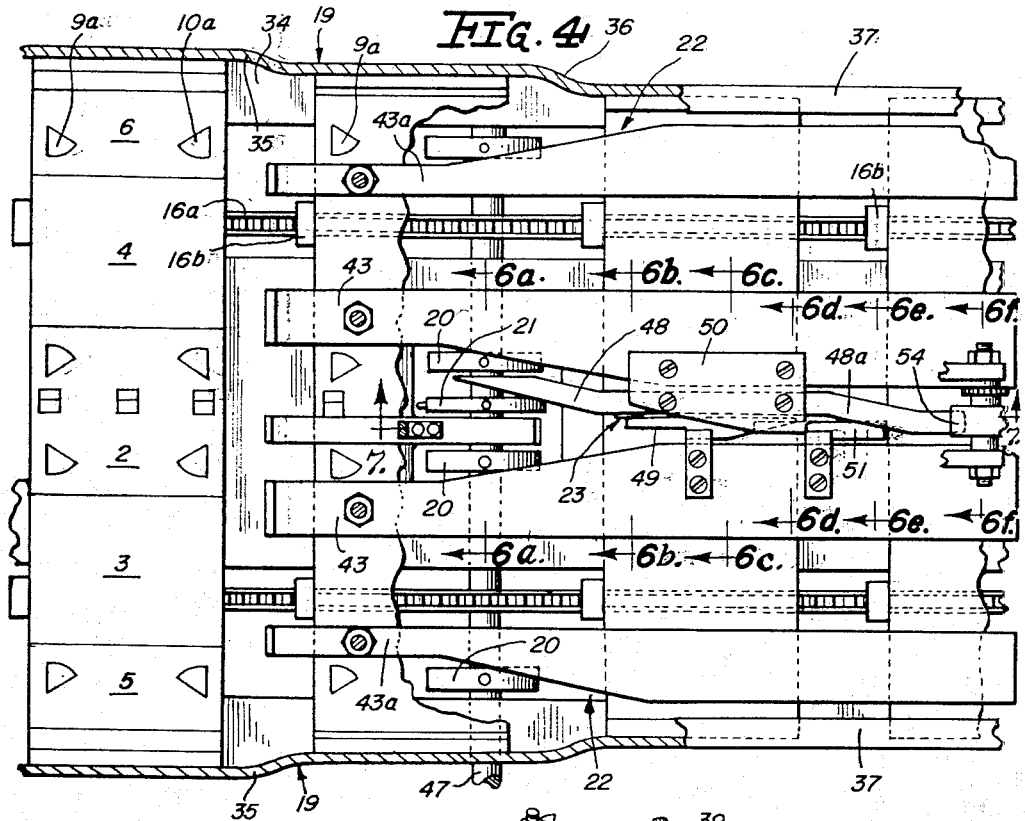
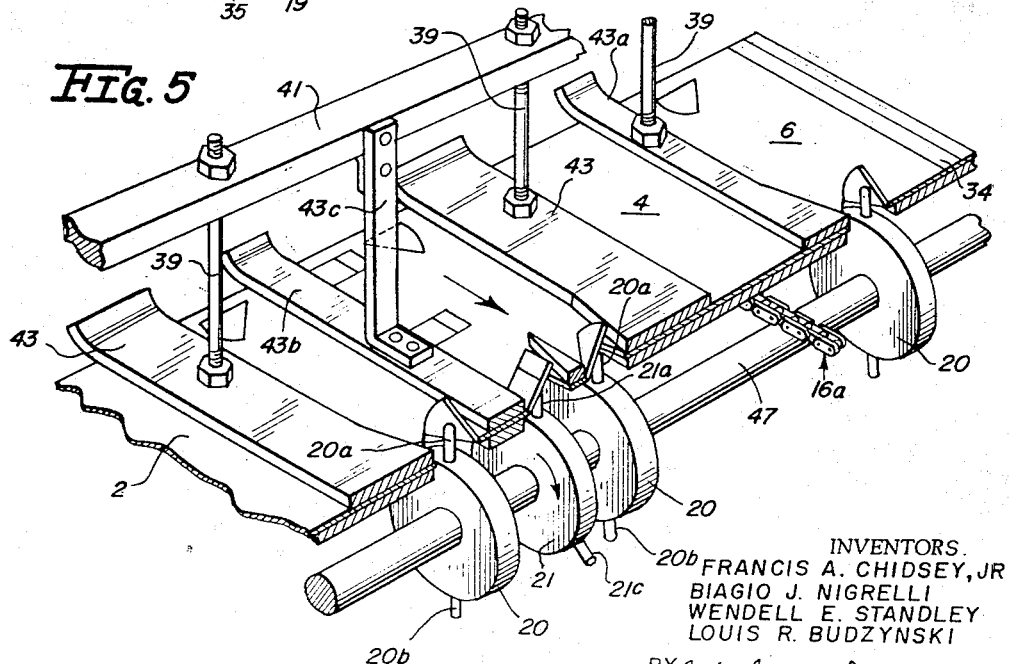

INVENTORS
FRANCIS A. CHIDSEY, JR.
BIAGIO J. NIGRELLI
WENDELL E. STANDLEY
LOUIS R. BUDZYNSKI
BY
ATTY.

Jan. 26, 1965   F. A. CHIDSEY, JR., ETAL   3,166,879
WRAP-AROUND CARTON LOADER
Filed July 9, 1962   8 Sheets-Sheet 5
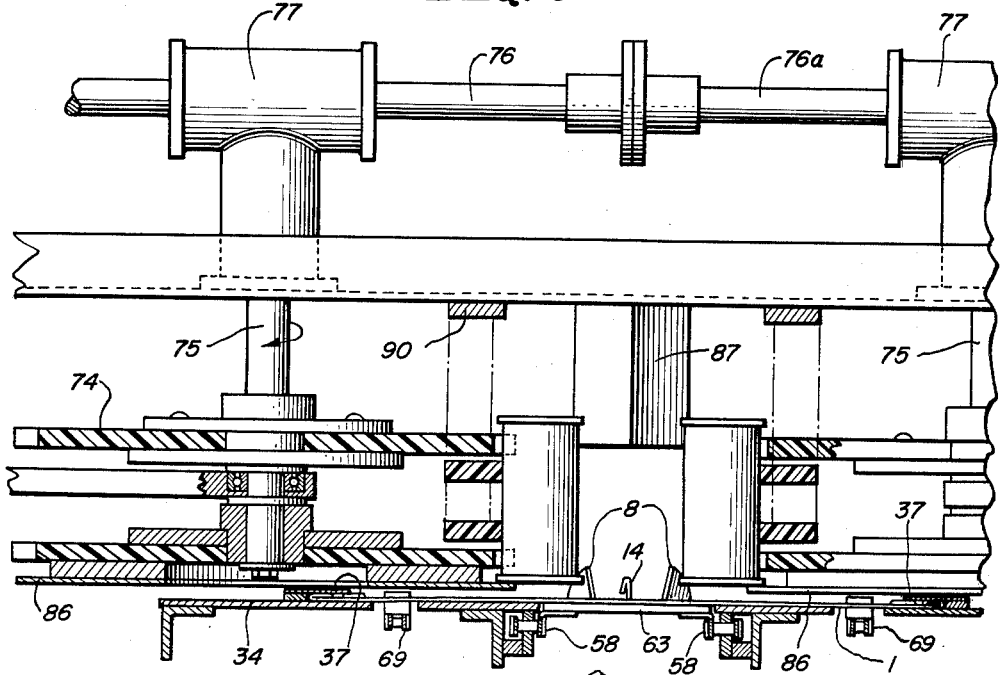
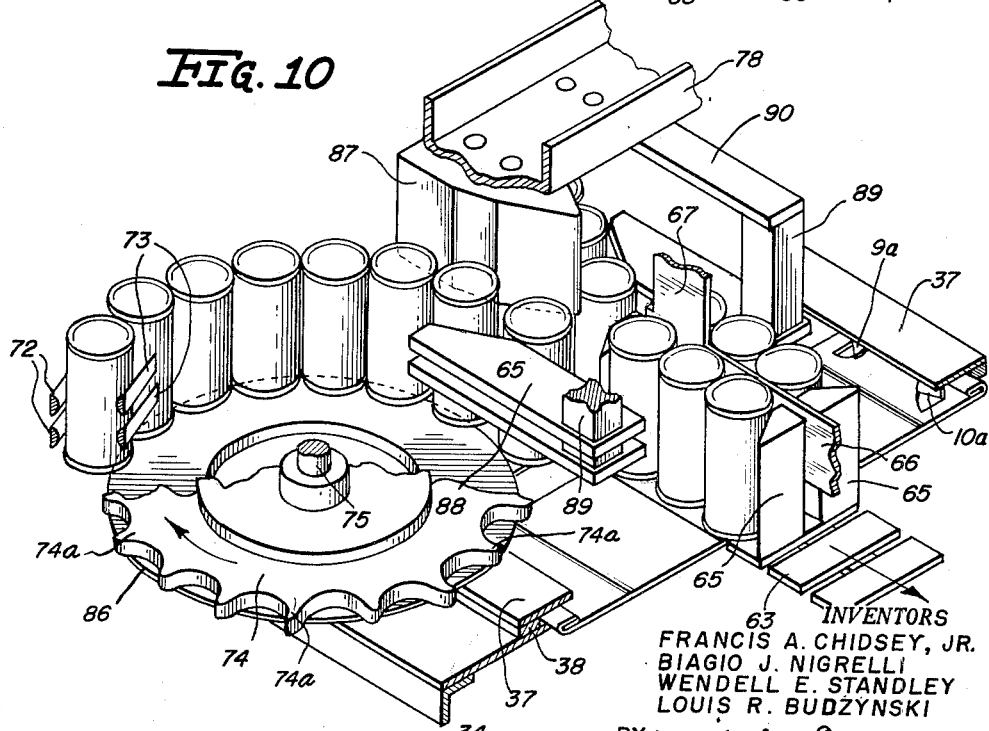
INVENTORS
FRANCIS A. CHIDSEY, JR.
BIAGIO J. NIGRELLI
WENDELL E. STANDLEY
LOUIS R. BUDZYNSKI
BY Richard W Carpenter
ATTY.

INVENTORS
FRANCIS A. CHIDSEY, JR.
BIAGIO J. NIGRELLI
WENDELL E. STANDLEY
LOUIS R. BUDZYNSKI

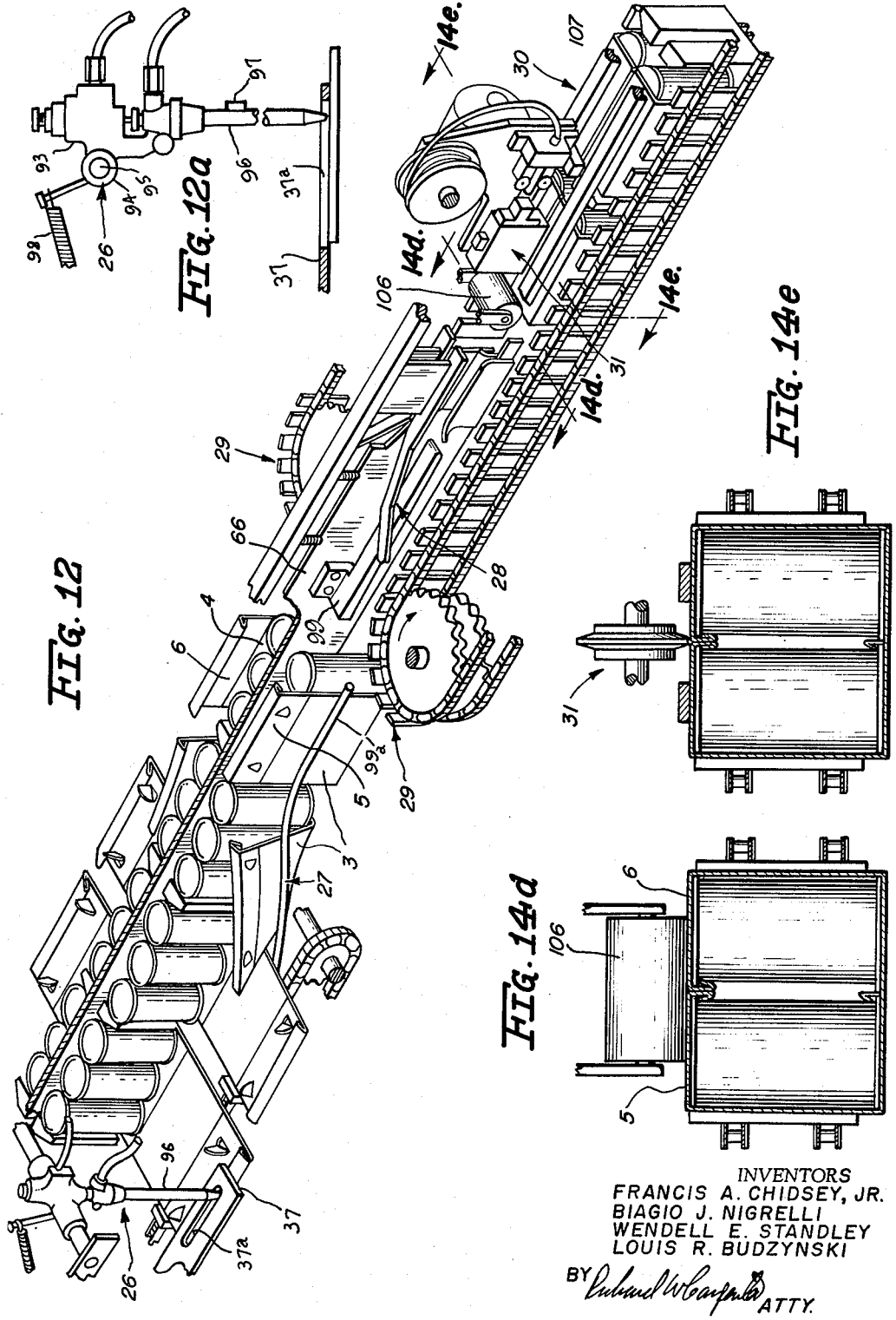

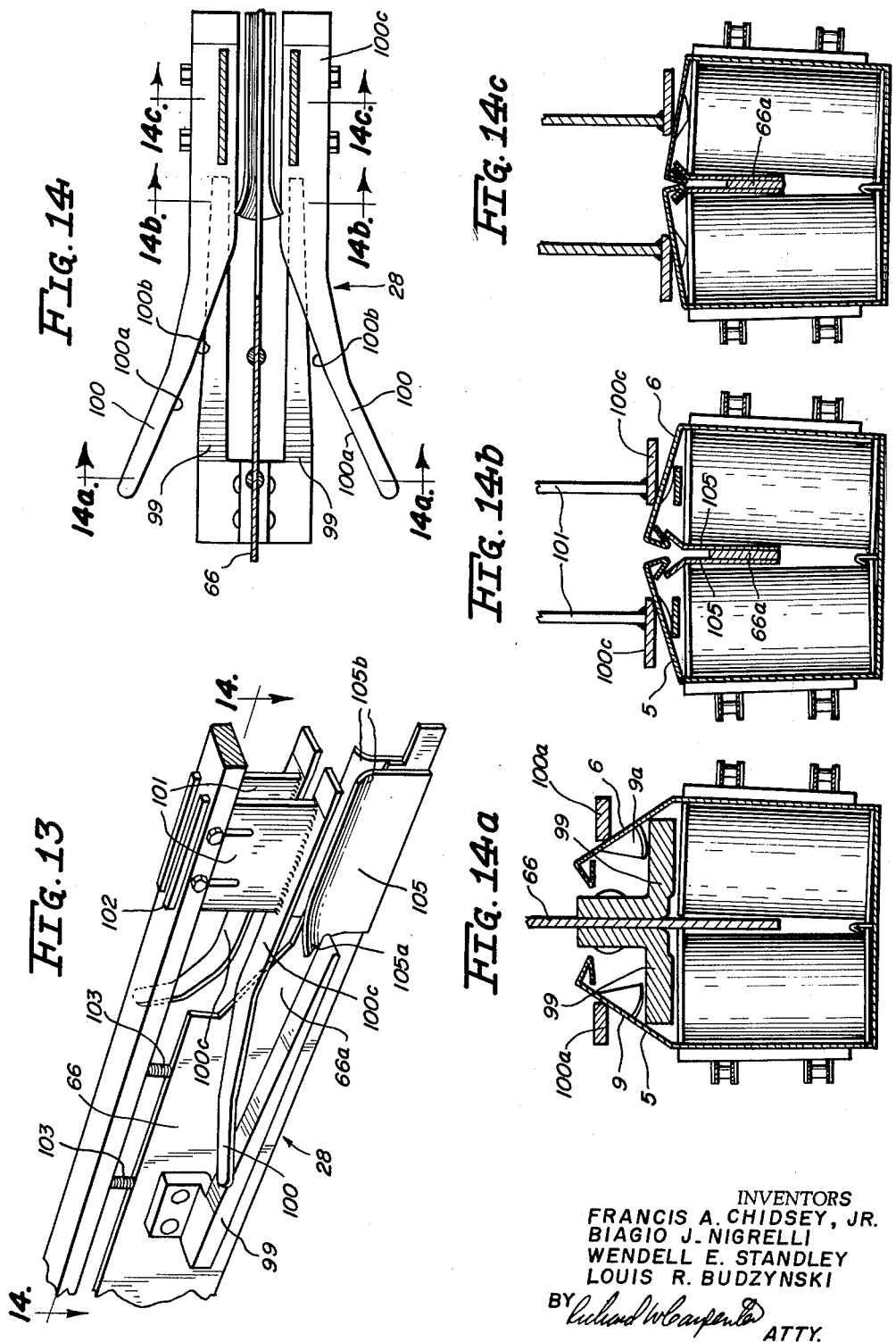

United States Patent Office 3,166,879
Patented Jan. 26, 1965

3,166,879
WRAP-AROUND CARTON LOADER
Francis A. Chidsey, Jr., Wayne, Pa., and Biagio J. Nigrelli, Northbrook, Wendell E. Standley, Lake Forest, and Louis R. Budzynski, Harwood Heights, Ill., assignors to Container Corporation of America, Chicago, Ill., a corporation of Delaware
Filed July 9, 1962, Ser. No. 208,360
10 Claims. (Cl. 53—48)

The present invention relates to carton loading machines and more particularly to machines for enclosing or wrapping a group of filled cans or similar articles within an open-end, paperboard blank or carton.

The principal object of the invention is to provide improved and efficient loading mechanism for open-end, wrap-around cartons of the type particularly adapted for groups of chimed-end cans, in which the width of the carton blanks employed is less than the length of the can rows and the carton blanks are formed with chime engaging elements or tabs for retention of the cans at the ends of the rows.

Another object of the invention is to provide mechanism for folding and otherwise treating the end portions of the blank for effectively joining the carton blank ends after completion of the operation of wrapping the carton blank around a can group.

A further object of the invention is to provide mechanism for prefolding the can chime engaging tabs and for controlling the positioning of the tabs for successful engagement of the chimed can ends with such tabs.

A still further object of the invention is to provide mechanism for prefolding ad controlling supplemental tab means carried on the blank for engagement with portions of the can chimes which are located adjacent the external, or normally vertical, walls of the cans for the purpose of retaining the carton walls at the ends of the cans from undue separation away from such can ends.

Additional and more specific objects and advantages of the present invention will become apparent as the description proceeds.

In the drawings—

FIG. 1 is a somewhat schematic plan view of a machine constructed in accordance with the invention showing flat carton blanks being conveyed past treating stations, delivery of can groups to the blanks and folding of the cartons about the can groups;

FIG. 2 is a plan view showing the preferred form of blank which the machine is designed to handle;

FIG. 3 is an end view of a can package looking at the package from an open end and showing how the outer edges of the can chimes are engaged and held against the upper and lower walls;

FIG. 3a is a fragmentary perspective and sectional view of a portion of the can package taken along line 3a—3a of FIG. 3 at the upper end of the package as shown in FIG. 3;

FIG. 3b is a fragmentary perspective and sectional view taken along line 3b—3b of FIG. 3 to show the supplemental chime engaging elements;

FIG. 4 is a top plan view of a portion of the machine showing the blank conveyor and tab displacing and folding elements as well as the folders for the end portions of the blank;

FIG. 5 is a fragmentary enlarged scale, perspective view showing devices timed with the blank conveyor travel for displacing the various tabs formed in the carton blank;

Figure 6A:
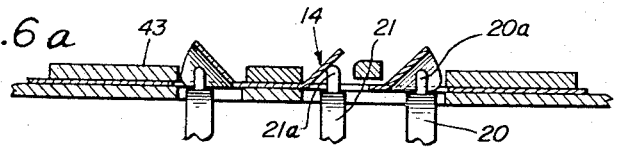
Figure 6B:
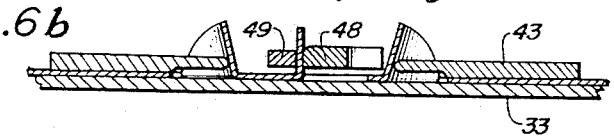
Figure 6C:
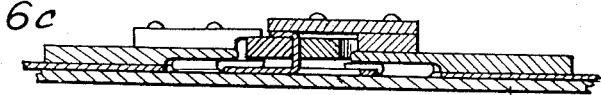
Figure 6D:
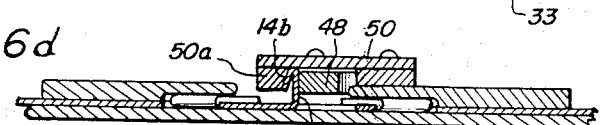
Figure 6E:
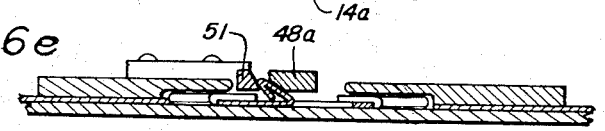
Figure 6F:
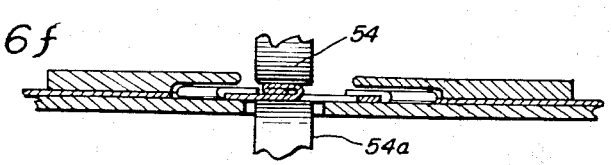
Figure 7:
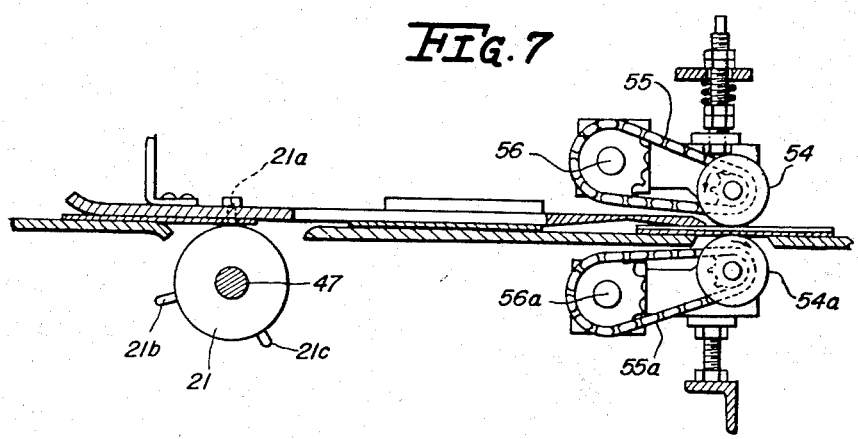
Figure 8:
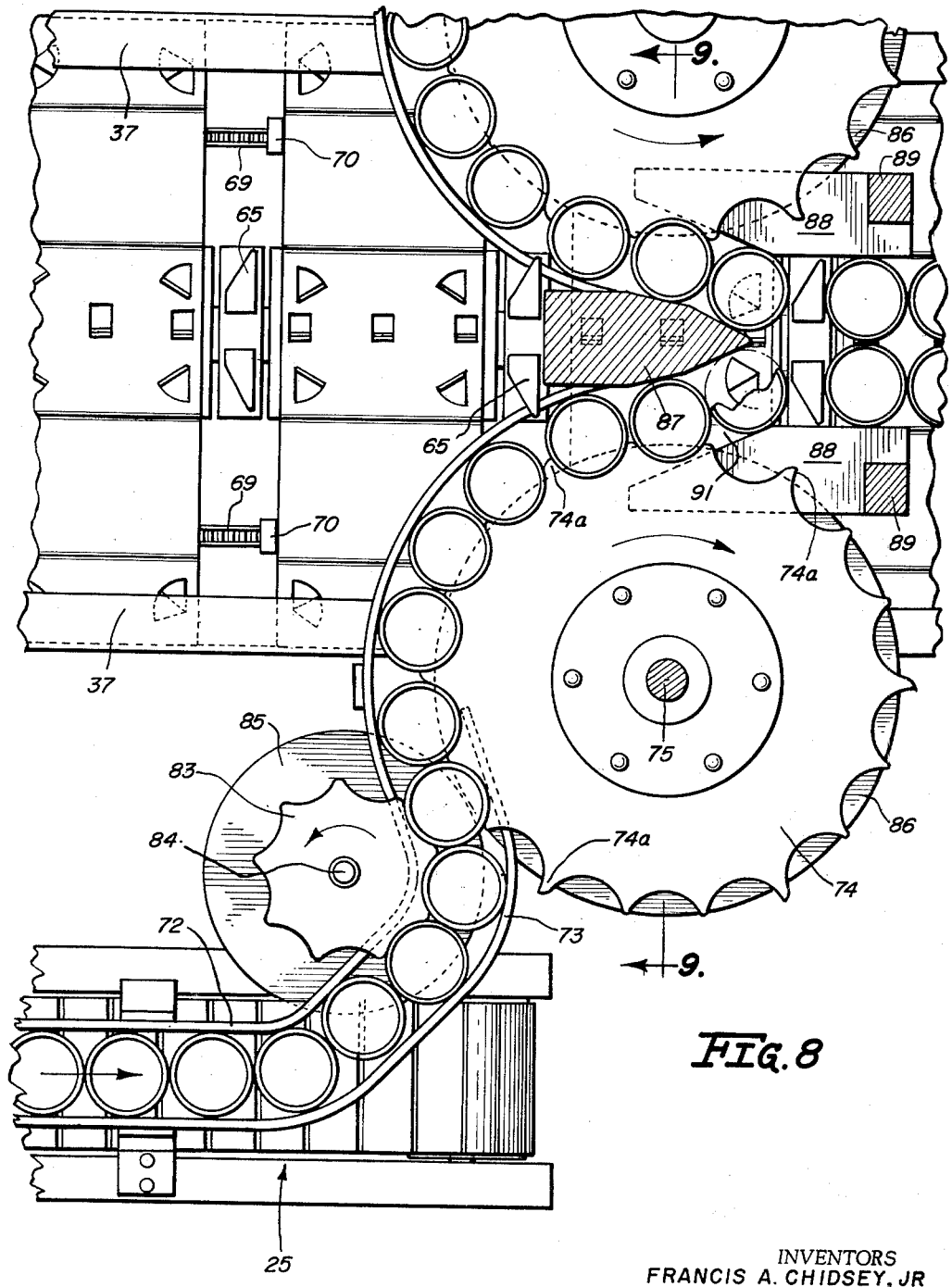
Figure 11A:
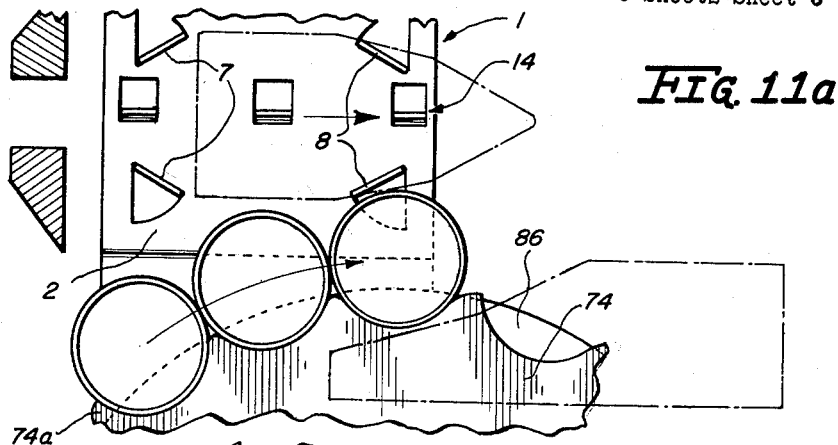
Figure 11B:
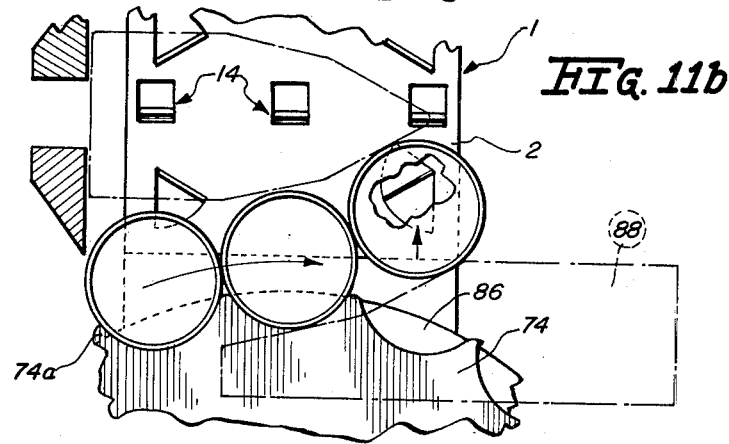
Figure 11C:
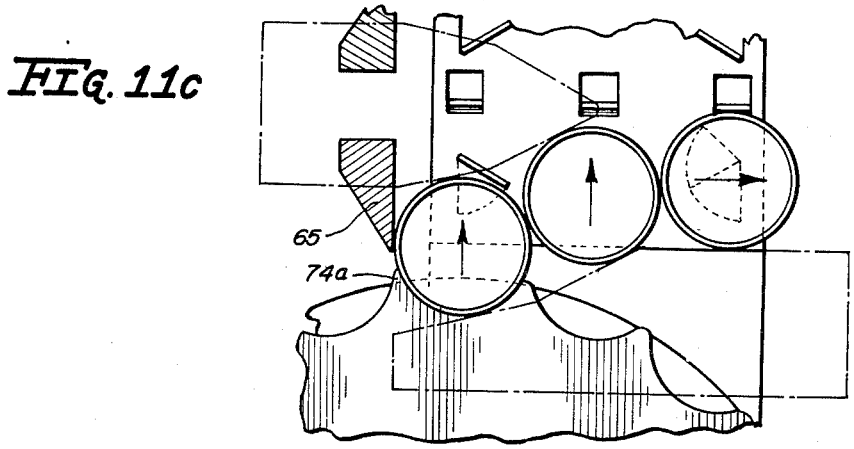

FIG. 6a to FIG. 6f, inclusive, are fragmentary sectional views taken along corresponding section lines of FIG. 4, showing tab displacing and folding devices;

FIG. 7 is a fragmentary side elevational view, partly in section, taken along line 7—7 of FIG. 4, looking in the direction of the arrows, showing the device for tightly prefolding the auxiliary chime engaging tabs;

FIG. 8 is a fragmentary plan view showing the blank conveyor and can conveying devices for depositing can groups on the blanks;

FIG. 9 is a transverse sectional view taken along line 9—9 of FIG. 8, showing the relationship of cans and can engaging tabs immediately prior to the deposit of cans upon the blank;

FIG. 10 is a fragmentary view showing a group of cans on a blank that has just passed the can transfer point;

FIGS. 11a, 11b and 11c are fragmentary detail views showing progressively the manner in which one row of cans arrives at the transfer point, and how the leading and trailing cans of such row move to fold in their retaining tabs and come to rest upon them;

FIG. 12 is a schematic perspective view showing the relative positioning of parts for the gluing and folding operations and final sealing of the glue joint;

FIG. 12a is a fragmentary perspective view of the adhesive applicator;

FIG. 13 is a perspective view showing the folding plow elements for folding down the narrow top panels and inserting the blank connecting parts between the can rows;

FIG. 14 is a horizontal sectional view taken on line 14—14 of FIG. 13;

FIGS. 14a, 14b and 14c are somewhat schematic, enlarged, vertical sectional views, taken along correspondingly numbered section lines of FIG. 14, showing the progression of the partially formed package as the top panels are folded downward; and FIGS. 14d and 14e are views similar to FIGS. 14a–14c, taken along correspondingly numbered section lines of FIG. 12, showing the pressure roller for pressing the flaps into final position and the application of a bead of hot melt material to the glue joint.

Wrap-around style, open end cartons have heretofore been employed in forming packages of chimed cans, but the cartons usually employed for this purpose have a blank width equal to the length of the can rows. The corner edges of the cartons have slits to admit a section of the can chime for the purpose of securely retaining the cans in position and to prevent them from slipping out the open carton ends. Other expedients have been employed to retain the cans but it has been generally essential to have the end portions of the carton extend to the extremities of the can rows. The present invention allows the use of relatively narrow carton blanks in the packaging of standard groups of six cans arranged in two rows of three cans each. The utilization of a narrower blank for a given length can row in a wrap-around style package is made feasible by forming the carton blank with foldable retaining tabs for engaging the inner surface portions of the can chimes at the can ends. By thus reducing the blank width from one-half to two-thirds of a can diameter, a considerable saving may be realized in the carton cost and, at the same time, the advantages of speed and convenience inherent in the formation of wrap-around packages is retained.

The machine of the present invention is designed primarily to load chimed cans within wrap-around cartons having can chime retaining tabs. The carton blanks are suitably cut and scored at the carton plant and delivered in flat form to the user of the machine. The blanks are advanced transversely of their lengths and, while being so moved, the chime engaging tabs are prefolded. A group of cans is then delivered onto the central panel of the blank and the end cans move into engaged position over the chime engaging tabs in such panel. The portions of the blank at each side of the central panel are then folded upward to engage the sides of the can rows. Finally, the panels forming the fourth side of the carton are folded down over the tops of the cans into the position in which they are secured. While such top panels are moving into position the chime engaging tabs formed in such panels are controlled so as to be in their engaging positions when the panels contact the can ends.

Referring more particularly to the drawings, the carton for which the present invention is particularly suited, shown in FIGS. 2, 3, 3a, and 3b, comprises an elongated rectangular blank indicated as a whole at 1. The blank is suitably scored to provide a central panel 2, side wall panels 3 and 4, and narrow panels 5 and 6 arranged to be joined to form a composite wall opposite panel 2. In the use of the carton the panel 2 is the top wall and the composite wall formed by panels 5 and 6 is the bottom. However, for convenience of description the central panel 2 of the completed carton may be considered the bottom wall and the fall formed by panels 5 and 6 may be considered the top wall.

The panel 2 is formed with four internal tabs 7, 7 and 8, 8, preferably located near the free edges of the panel and foldable on diagonal hinge lines. Panels 5 and 6 are similarly formed with tabs 9, 10 and 9a, 10a respectively. The tabs in panel 2 when folded inward 180° will engage against the chimes of cans C, C at their lower ends, as viewed in FIG. 3, and the tabs in the panels 5 and 6 will engage in a similar manner against the upper chimes, as indicated in FIG. 3a.

For the purpose of holding the cans closely against panels 5 and 6 the blank is formed with pairs of narrow panels 11, 12 and 11a, 12a carried respectively on panels 5 and 6. By gluing panels 11 and 11a together, as shown in FIG. 3, with panels 12 and 12a folded closely against their attached panels, the panels 12 and 12a will engage edgewise against the outer surfaces of the can chimes along the cylindrical sides of the cans.

For a more detailed explanation of this particular form of chime engaging construction reference is made to reissue patent to R. A. Cote, Reissue No. 25,111, January 9, 1962, now Patent 3,069,549.

The carton herein shown has additional chime engaging tabs 14, 14, 14, each formed within the panel 2 and folded to form a part 14a, which is hinged directly to the panel, and a second part 14b hinged to the free end of part 14a. This second part, when folded against the first part, will engage the outside edge of the can chime adjacent against the cylindrical surface of the can, as shown in FIG. 3b.

The machine, as shown in FIG. 1, is mounted on a suitable base 15 which supports a blank delivery conveyor, indicated as a whole at 16, onto which the blanks 1, 1 are delivered from a magazine 17 by a suitable blank feeding mechanism located above the conveyor. The flat blanks are conducted past edge folders 19, 19 and past tab displacing wheels 20, 20 and 21 (see FIGS. 4 and 5) and tab folding members 22, 22 and 23. The blanks are next transferred to a loading conveyor 24.

A pair of can conveyors 25, 25 at the sides of the blank conveyor conduct the cans C, C to the loading station. The blanks, with their can groups placed on their central panels, are conveyed past an adhesive applying member 26 and thence past folding plows 27 for folding up the side panels 3 and 4, and afterward conveyed past folding plows 28 for folding down the narrow top panels 5 and 6 onto the upper ends of the can groups. When the narrow panels 12, 12a are brought together in their securing position the partially completed packages are conveyed between side pressure members 29, 29 and beneath a downward pressure applying member 30 for holding the panels 5 and 6 against the can tops. A quick sealing device 31 then applies a bead of hot melt along the joint between panels 12 and 12a after which the packages may be discharged from the conveyor.

The blanks 1 may be stored on edge in a pair of the magazines one of which is shown at 17. The blanks are removed alternately from these magazines by a reciprocable vacuum cup unit such as shown in the patent of G. C. Currie, Jr., et al. No. 3,013,796. The blanks are deposited flatwise upon conveyor 16 disposed below the magazines. This conveyor comprises a pair of chains 16a with pushers 16b thereon to convey the blanks transversely of their lengths. The ends of the blanks are supported on suitable rails or guides leading to the edge folder 19. The conveyor chains pass over suitable sprockets fixed on a drive shaft at the discharge end of the conveyor. The sprockets at the receiving end of the loading conveyor turn freely on this drive shaft and the loading conveyor moves at a slower lineal speed to facilitate the transfer of the blanks to the loading conveyor.

*Folding blank edges and retaining tabs*

As shown in FIGS. 4 and 5, the blanks are spaced in the direction of their travel and are first moved into engagement with folders 19. A centrally positioned plate 33, located between the sprocket chains 16a, 16a, serves to support the midportion of the blank and the end portions of the blank are supported on plates 34, 34 which extend along the machine to the loading station. See FIGS. 4 and 10. Along the outer edge of each plate there are secured the parts of folder 19. The first section, indicated at 35, at each end of the blank serves to plow the outer narrow panels 12, 12a first upward and then downward against their connected panels 11, 11a. An additional section 36 plows the two folded panels upward and then downward against their respective attached panels 5 and 6. The narrow panels, as so folded, pass beneath a hold-down plate 37 held spaced from the supporting plate 34 by a spacer bar 38. The folded edge panels continue to be held below plate 37 to a point beyond the loading station. See FIG. 10.

As the extremities of the blanks are being folded, the blanks pass beneath the tab folders 22 and 23. Referring first to the folders 22, there is a folder for each aligned pair of retaining tabs 7, 8; 7, 8; 9, 10 and 9a, 10a. See FIGS. 4 and 5. The folders are supported by vertically extending bolts 39, 39 and 40, 40 secured to overhead, transversely extending frame members 41 and 42 respectively (see FIGS. 1 and 5) attached to suitable vertical frame members (not shown) which are secured to the base of the machine. The bolts 39 are secured to the end sections of the folders, indicated at 43, 43a, which serve to hold the blanks from upward movement as the tabs are being displaced. The bolts 40 are secured to the opposite ends of the folders which terminate along a line spaced from the receiving end of the loading conveyor 24.

The tab displacing wheels, best shown in FIGS. 4, 5 and 7, are fixed on a shaft 47 rotatable in bearings on the base frame and suitably driven in timed relation with the blank delivery conveyor. There is a wheel 20 for each set of diagonally foldable tabs and each wheel carries spaced, radially extending fingers 20a and 20b which engage and displace upwardly the respective tabs adjacent the leading and trailing edges of the blanks.

The centrally located tabs 14 are displaced and folded upward by fingers 21a, 21b and 21c on wheel 21. A bar 43b, held on frame member 41 by a bracket 43c, is positioned with an edge extending along the fold lines of the tabs 14 (see FIGS. 5 and 6a) so that when such tabs are swung upward they pivot about the edge of the bar 43b. As the blank advances the tabs 14 are first held upright between folding bars 48 and 49 (see FIGS. 4 and 6b) and a further advance brings the tab end 14b in contact with the diagonal edge of a plate 50 which folds this tab end flat upon the bar 49 (see FIG. 6c). A short folding bar 50a secured on the under surface of the plate 50 then folds the tab end 14b downward (see FIG. 6d) as the blank continues to travel, and a diagonal section 48a of bar 48 then engages the tab base section 14a and forces it and its folded section 14b against the inclined face of a short bar 51. This causes the end 14b of the tab to be folded below the base section 14a. Finally, the tab moves between the surfaces of spring tensioned press rolls 54, 54a (see FIGS. 4, 6f and 7) which tend to press the tab sections together with a considerable degree of force such that, when the folded tabs 14 are released from between the press rolls, they will move to upright position and remain upright and folded until cans move into position against them at the loading station. The press rolls are arranged to be driven by sprocket chains 55, 55a passing over sprockets on short shafts 56, 56a which may be driven in unison by suitable gearing, not shown, connected to the drive for conveyor 16.

The diagonally hinged tabs, displaced upward by wheels 20, 20, move against the diagonal edges of folding bars 43 and 43a and are folded down and beneath the edges of these bars. As shown in FIGS 6b to 6f, these bars have suitably undercut edge portions to hold the tabs folded down against their attached panels until they reach the end of the folder section and the blanks are ready for transfer to the loading conveyor.

Blank transfer

The mechanism for transferring the flat blanks from the delivery conveyor 16 to the loading conveyor 24 forms no part of the present invention. This transfer may be effected by various specific forms of mechanism and may be constructed as shown in the above mentioned Currie patent. The principal consideration in the blank transfer is to deliver the blanks at a sufficient speed so that they are brought to position on the loading conveyer between the upstanding members which serve to separate can groups on the loading conveyor. The blank must be moved inward behind one of the separators while the next following separator is passing up around the sprockets at the receiving end of the loading conveyor. As shown in FIG. 1, the ends of the blank, with their edge portions pre-folded, pass from the folder section along plates 34 and beneath plates 37 to maintain such edge portions folded until the end panels of the blank are ready to be folded up and over the can group. Likewise, the pre-folded tabs 9, 10, and 9a, 10a will be held folded beneath the plates 37. See FIG. 10.

Loading conveyor

The loading conveyor 24 includes two central sprocket chains 58, 58 (see FIG. 9) passing around sprockets on shaft 59 at the receiving end of the conveyor and around similar sprockets on shaft 60 at the discharge end of the conveyor. The shaft carries a drive sprocket 61 at the discharge end driven by sprocket chain 62 connected with a suitable motor, not shown. The chains 58 carry a series of flat plates 63, 63 having a dimension transverse to the conveyor travel equal to the width of the panel 2 of the blank on which the can groups are delivered. Selected plates, which conveniently may be every fourth plate, carry spaced, upstanding can engaging and supporting members 65, 65. These members are spaced apart on each side of the center line of the conveyor to accommodate between them a divider plate 66 supported on a bracket 67 carried on an upper frame member 78.

The loading conveyor also includes a pair of sprocket chains 69, 69 having lugs 70, 70 thereon for engagement with the trailing edges of the blanks. These chains pass around sprockets fixed on the shaft 59 and move at the same speed as the chains 58. The lugs 70 move somewhat in advance of the can engaging members 65 for the reason that the cans project part way beyond the edges of the blank and the open ends of the completed carton.

Can loading station

The cans to be loaded are advanced to the loading point on continuously operating flat plate conveyors 25, 25 and are moved off these conveyors between pairs of upper and lower guide bars 72, 72 and 73, 73 to star wheels 74, 74, one on each side of the loading conveyor.

As shown in FIG. 9, these star wheels are constructed with identical upper and lower sections fixed on vertical shafts 75, 75 driven by aligned shafts 76, 76a through transmission gears in gear boxes 77, 77 supported on overhead frame element 78. The shaft 78 as shown in FIG. 1 has a sprocket 79 fixed on its end connected by a sprocket chain to suitable driving means, not shown, for rotating the star wheels 74 in unison and in timed relation to the loading conveyor. In order to prevent jamming of the cans against star wheels 74 due to the pressure of oncoming cans on the continuously operating conveyors 25, the advancing rows are metered by a pair of smaller star wheels at each side of the machine indicated at 82 and 83. See FIG. 1. These star wheels are also formed with identical upper and lower sections to engage the cans both above and below the guide bars.

The star wheel units 82 and 83 are each secured frictionally on their vertical shafts 82a and 84. Below the star wheel units 83 on each side of the machine is secured a disk 85 on each shaft 84. The disks are disposed at a level just below the edges of the can conveyors so that, as the cans move between the guide bars 72, 73 and around the star wheels, they will drop a short distance onto the disks and will be supported by such disks as they advance toward the star wheels 74.

Mounted below each star wheel 74 is a disk 86 projecting sufficiently beyond the notches of the star wheel to support cans delivered from the adjacent disk 85. The cans are thus held upright within the star wheel notches by the guide bars 72. The notches in the star wheels are arranged in groups of three, this being the number of cans in each row of the package. The star wheel teeth separating the groups are made wider than the other teeth to compensate for the spacing between the can groups produced by the thickness of the upright can separating members 65. See FIG. 8. As shown, the star wheels are so arranged with respect to the loading conveyor that the wider teeth move in registration with the members 65.

As best shown in FIGS. 9 and 10, the end portions of the advancing blanks 1, 1 move in the space between the star wheel disk 86 and the plate 34. It is to be noted that the narrow end panels which have been previously folded remain in their folded condition, being held by plate 37. Similarly, the diagonally foldable tabs 9, 10, and 9a, 10a, plowed down by the folder bars 43a, are maintained folded by the plate 37.

The advancing cans, carried within the pockets of star wheels 74 and resting with their edge portions on disks 86 (see FIG. 9), are delivered above the center panel of the blank. Mechanism is provided for transferring the cans from the star wheel supporting disks onto the blanks and at the same time moving the cans so that the end cans in the sub-groups bear against and fold down the diagonally foldable tabs 7 and 8. The cans then drop from the disks with the end cans resting upon the folded tabs in proper position for the engagement of the tabs against the can chimes.

The mechanism for transferring the cans from the disks 86 to the panel 2 of the blank is shown in FIGS. 8, 9, 10, 11a, 11b and 11c. A centrally located guide block 87 is secured on the underside of frame member 78 and projects downward sufficiently to be contacted by the shortest cans for which the machine is designed. This block is tapered to a thin edge in the direction of advancing movement of the loading conveyor. A second guide or cam member 88 is located, one on each side of the guide block 87. These guides are supported on frame elements 89, 89 secured to brackets 90, 90 extending from overhead frame member 78. The can contacting faces of the elements 89 are shaped at 91 to conform with the tapered portions of the block 87 to guide cans accurately between these parts. As shown in FIG. 11a, when the leading can of each sub-group of three cans approaches the loading point, the lower, outer surface of such can will be traveling adjacent the upturned leading tab 8 on the blank panel 2. Likewise, the trailing can of the sub-group will travel along with the trailing tab 7. The lower end of the can first bears against the raised tab and begins to fold it toward the center of the blank panel 2. While the can is in the process of moving the tab inward and downward the can will be forced off the disk 86 by the cam guide 88 and will come to rest upon the downfolded tab. See FIG. 11b.

The trailing can of the sub-group which is being propelled by the tooth 74a of the starwheel will in a similar manner engage and fold over the trailing tab 7 and then come to rest upon it. Before the tooth 74a passes around out of control of the trailing can of the sub-group the upstanding pusher member 65 will engage the can and thereafter propel it. Any slight inaccuracy of positioning the cans on the blank panel 2 will be corrected when the member 65 engages and begins to propel the trailing can.

As soon as each sub-group of cans has been moved past the guides 87 and 88 they will be accurately aligned on the blank central panel 2 and the tabs in this panel will be in their operative positions for engagement with the can chimes at the end walls of the cans.

Adhesive applicator

After the blanks with a group of cans placed on the central panel leave the loading station they are ready for the application of adhesive to the folded narrow panel 11 at one end of the blank after which the panels at the sides of the central panel are folded around the sides and top of the can group. As herein shown, the adhesive is applied to panel 11 through a slot 37a formed in the end of the hold-down plate 37 on one side of the machine. The adhesive applicator preferably comprises a main body portion 93 having hollow bosses 94 carried on a pivot rod 95 suitably secured on the frame. A nozzle 96 secured to the body portion is arranged to swing lengthwise of the slot 37a and is held in vertical position by a stop 97. A coil spring 98, having an end secured to a pin on the body portion, serves to hold the nozzle in position against the stop. A suitable valve means, controlled in timed relation to the loading conveyor travel, is employed to discharge adhesive from the nozzle as the end portions of the blanks move past the nozzle.

Folding side and top walls

As the blank and can group continue to advance, the portions of the blank at the sides of the central panel, each comprising a side wall and narrow panel forming one-half of the top wall, are folded up by folding plows 27. Following this, the narrow panels are folded down while moved along the plow section 28. See FIG. 12. As the upfolded side panels 3 and 4 advance beyond the plow members 27, the partially formed package moves between the travelling side-pressure members 29, 29, which at this point may be arranged in positions simply to hold the panels upright without applying pressure. Upon further advance, the can groups pass beneath guide bars 99, 99 attached by vertical brackets onto the divider plate 66. These bars, shown in FIGS. 12, 13 and 14, serve to hold the folded, chime-engaging tabs 9, 10 and 9a, 10a in proper folded position to assure that they will not swing back to an angle less than 90° with respect to their original position within their attached panels. By retaining these tabs at angles in excess of 90° relative to their original positions, they may then readily be swung into proper chime-engaging position as the parts advance. This applies particularly to the trailing tabs 9 and 9a due to the fact that these tabs are folded forwardly, or in a direction of advancing movement. The other tabs, 10 and 10a, being folded rearwardly of the travel, upon brushing against the bars 99, will tend to be readily folded beyond their 90° position as the top panel advances and is folded down.

As best shown in FIG. 14, the vertically disposed top panels 5 and 6, as they move along the bars 99, are first engaged by plows 100, 100 which will start them on their downward swinging movement. As shown in FIG. 14a, this downward movement brings the chime-engaging tabs more closely against the bars 99 to progressively swing them toward their final position. The plows 100 have inwardly inclined sections 100a and 100b extending into straight, longitudinally extending sections 100c welded to vertical supportig plates 101 which may be adjustably mounted on a frame element 102 adjustably supported by machine screws 103 secured on divider plate 66. The sections 100c of the plows 100 are downwardly inclined, as can be best understood by comparison of the FIGS. 14a and 14b.

As the top panels 5 and 6 continue their advance, they will be progressively swung down by the inwardly angled edges 100a and 100b of the plows and next by the lower surfaces of sections 100c which are downwardly inclined. This will bring the folded edge portions of the panels toward each other, preparing them for insertion between the two rows of cans. As previously explained, the panel 11 has received a coating of adhesive.

While the panels 5 and 6 are being depressed by the downwardly inclined sections 100c, the folded panels 11, 12 and 11a, 12a are received within vertically positioned guides 105, 105, preferably formed of thin sheet metal, having relatively wide flaring sections 105a blending into narrower flaring sections 105b. The lower parts of the guides 105, 105 are secured to a vertically narrowed portion 66a of the divider plate 66, having its top portion suitably cut away, as shown in FIG. 13, to accommodate the folded edge panels 11, 12 and 11a, 12a as they are moved toward their final position between the can rows.

The thickness of the divider plate 66 is such that the upper ends of the cans in the two adjacent rows are tipped away from each other sufficiently to permit the two sets of folded edge panels on top panels 5 and 6 to be inserted between the can rows. When the folded edge panels are so inserted, which occurs just beyond the position shown in FIG. 14c, the travelling side-pressure members 29, 29 are so controlled as to press inward upon the carton side walls and can rows to bring the flanges of the adjacent rows of cans firmly against the contacting edge panels 11, 11a with edges of the narrower panels 12, 12a in position to engage the lower edges of the upper can chimes.

In order to assist in positioning the edge flanges properly in relation to the can chimes a pressure roll 106 is arranged beyond the folder section to bear upon the down-folded panels 5 and 6 and upon the joined edge flanges. Beyond the pressure roll 106 there may be arranged a pair of spaced hold-down bars or rails indicated at 30.

Ths chime engaging tabs move along the guide bars 99 during the initial folding movement of the panels 5 and 6 and these guide bars are tapered in the direction of advancing movement, as shown in FIGS. 13, 14a and 14b. When the tabs move off the ends of the bars 99 they are close enough to the ends of the cans so that their edges will engage such can ends and assure the retention of the tabs in proper folded condition.

After the packages pass beyond the pressure roll 106 they are brought beneath a suitable hot melt applicator as shown at 31 where a bead of hot melt material will be deposited along the upper portion of the joint formed by the contacting edge panels 11, 11a. This applicator may be of any desired form and may be constructed as shown in the copending application of F. A. Chidsey, Jr. Serial No. 125,920, filed June 10, 1961, and assigned to the assignee of this application. Other quick-acting methods of joining the edge flanges or the adjacent edges of the panels 5 and 6 may be employed.

The bead of hot melt material serves to hold the glue joint firmly immediately after it is applied and thus the package is ready to be released from the side and top pressure-applying members in a short distance of travel beyond the hot melt applicator. At the end of the loading conveyor, as the upstanding can-engaging members 65 pass down around their sprockets at the conveyor discharge end, the packages may be transferred to a short overhead magnetic conveyor and deposited thereafter on a suitable off-bearing conveyor, such as a chute, belt or rolls, as desired.

When references in the foregoing description are made to various parts as disposed or movable vertically or horizontally, it is to be understood that this is for convenience of description and not in a limiting sense. Similarly, the joined panels 5 and 6 may constitute either the top or bottom panels of the completed carton as found desirable or convenient.

While the present description sets forth a preferred form of the invention, numerous changes may be made in the mechanism as disclosed without departing from the spirit of the invention, and it is therefore desired that the present disclosure be considered in all respects as illustrative and not restrictive, reference being had to the appended claims rather than to the foregoing description to indicate the scope of the invention.

We claim:

1. Mechanism for enclosing a group of chimed cans within an elongated paperboard blank of the type having a central panel, side wall panels on opposite sides of the central panel and top panels on each of the side wall panels at the ends of the blank, the central panel having hinged, chime engaging, retaining tabs formed within the contour of such panel adjacent its free edges, conveying means for advancing a flat, unfolded blank of the type defined at a fixed speed in a direction transverse to its length with the retaining tabs displaced upwardly of the blank, means for supporting and conveying chimed cans successively in upright position at a speed timed with the blank travel and in an oblique path relative to the direction of travel of the blanks, said supporting means delivering the cans with their lower ends moving in a plane slightly above the plane of travel of the unfolded blanks to deposit cans upright upon the central panel of the blank, and opposed guide means disposed in fixed position over the path of the advancing blank and engaging laterally upon opposite surfaces of the cans to direct the leading portions of individual cans in their oblique movement against individual, upwardly displaced tabs to fold an engaged tab through the remainder of 180 degrees of movement as the can is transferred from the supporting means onto the blank and into position over its tab with the inner surface of the can chime in engaging relation to its tab.

2. Mechanism for enclosing the group of two adjacent rows of chimed cans within an elongated blank of resilient paperboard of the type having a central panel, side wall panels on opposite sides of the central panel and top panels on each of the side wall panels at the ends of the blank, the central panel having hinged, outer chime holding tabs formed within the mid-portion of such panel and arranged in alignment transversely of the blank, each of such holding tabs having a downwardly foldable end portion adapted to lie flat against a can wall with its free edge in holding engagement with the edge of the chime, conveying means for advancing a flat blank of the type defined at a fixed speed in a direction transverse to its length, means for displacing the holding tabs upwardly of the blank, means for successively folding each tab end portion downwardly toward the tab hinge and for folding the tab, together with its folded end portion, downwardly against the attached central panel, whereby, upon release of the tab from the folding means, it will assume a generally upright position with its folded end portion extending downward, means for delivering an opposed pair of cans onto the central panel in upright position with a can bearing upon opposite sides of the raised holding tabs, whereby the downfolded tab end portions are held between the opposed cans and the upper chime edge of one of the cans in such opposed pair is brought into holding relation to the lower free edge of the downfolded tab end portion.

3. Mechanism for enclosing a group of two adjacent rows of chimed cans within an elongated blank of resilient paperboard of the type having a central panel, side wall panels on opposite sides of the central panel and top panels on each of the side wall panels at the ends of the blank, the central panel having hinged, outer chime holding tabs formed within the mid-portion of such panel and arranged in alignment transversely of the blank, each of such holding tabs having a downwardly foldable end portion adapted to lie flat against a can wall with its free edge in holding engagement with the edge of the chime, conveying means for advancing a flat blank of the type defined at a fixed speed in a direction transverse to its length, means for displacing the holding tabs upwardly of the blank, means for successively folding each tab end portion downwardly toward the tab hinge and for folding the tab, together with its folded end portion, downwardly against the attached central panel, whereby, upon release of the tab from the folding means, it will assume a generally upright position with its folded end portion extending downward, means for supporting and conveying a line of upright, chimed cans in an oblique path from opposite sides of the central panel, said means being timed with the blank conveying means to bring pairs of opposed cans successively over the central panel with the bottom ends of the cans spaced slightly above the conveyed blank, and guide means for discharging the opposed pairs of cans from such conveying and supporting means onto the central panel and against opposite sides of the raised holding tabs, whereby the downfolded tab end portions are held between opposed cans and the upper chime edge of one of the cans in such opposed pair is brought into holding relation to the lower free edge of the downfolded tab end portion.

4. A mechanism for enclosing a group of vertically disposed, uniform, chimed cans within an elongated, wraparound, paperboard blank of the type having a central panel, side wall panels on opposite sides of such panel and two narrow top panels, one on each of the side wall panels at the ends of the blank, the top panels along their free edges having combined joining and cam chime engaging means, each comprising first and second narrow panels, the first narrow panel being hinged to the free edge of its top panel and the second narrow panel being hinged to the first panel and being narrower than the first panel by approximately the vertical dimension of the chimes of cans to be enclosed within the blank, whereby, when the first narrow panels of the two top panels are secured together flatwise with the second panels folded against and outside the joined first panels, the free edge of each second panel is adapted to engage the edges of the chimes of cans which are in flatwise contact against the first narrow panel, such mechanism comprising, in combination, conveying means for advancing a flat blank of the type defined in a direction transverse to its length, the blank having a group of two rows of cans placed symmetrically on the central panel with the rows extending in the direction of blank travel, means acting as the blank advances for folding the second narrow panel at each end of the blank inwardly against the first narrow panel, means for thereafter folding both of said folded panels inwardly against the respective inner faces of the top panels with each second narrow panel interposed between its attached first narrow panel and top panel, means for applying adhesive to the exposed surface of one of the first narrow panels, means acting as the blank, with cans thereon, advances for folding the side panels and attached top panels upward to bring the side panels against the sides of the can group, means acting thereafter as the blank advances for folding the top panels down to bring the first narrow panels into flatwise, facing contact and to insert such assembled narrow panels between the can rows with the top panels engaging the can end, whereby the adjoining surfaces of the first narrow panels will be adhered and the edges of the second narrow panels will be engaged beneath the exterior edges of the adjacent chimes of cans enclosed by the blank.

5. A mechanism for enclosing a group of vertically disposed, uniform, chimed cans within an elongated, wrap-around, paperboard blank of the type having a central panel, side wall panels on opposite sides of such panel and two narrow top panels, one on each of the side wall panels at the ends of the blank, the top panels along their free edges having combined joining and can chime engaging means, each comprising first and second narrow panels, the first narrow panel being hinged to the free edge of its top panel and the second narrow panel being hinged to the first panel and being narrower than the first panel by approximately the vertical dimension of the chimes of cans to be enclosed within the blank, whereby, when the first narrow panels of the two top panels are secured together flatwise with the second panels folded against and outside the joined first panels, the free edge of each second panel is adapted to engage the edges of the chimes of cans which are in flatwise contact against the first narrow panel, such mechanism comprising, in combination, conveying mechanism for advancing a flat blank of the type described in a direction transverse to its length, the blank having a group of two rows of cans placed symmetrically on the central panel with the rows extending in the direction of blank travel, means acting as the blank advances for folding the second narrow panel at each end of the blank inwardly against the first narrow panel, means for thereafter folding both of said folded panels inwardly against the respective inner faces of the top panels with each second narrow panel interposed between its attached first narrow panel and the top panel, means for applying adhesive to the exposed surface of one of the first narrow panels, means acting as the blank, with cans thereon, advances for folding the side panels and attached top panels upward to bring the side panels against the sides of the can group, means acting thereafter as the blank advances for folding the top panels down to bring the first narrow panels into flatwise, facing contact and to insert such assembled narrow panels between the can rows with the top panels engaging the can ends, whereby the edges of the second narrow panels will be engaged beneath the exterior edges of the adjacent chimes of cans enclosed by the blank, and means movable with the folded blank for applying inward pressure upon the side wall panels to hold them firmly against the sides of the can group.

6. A mechanism for enclosing a group of vertically disposed, uniform, chimed cans within an elongated, wrap-around, paperboard blank of the type having a central panel, side wall panels on opposite sides of such panel and two narrow top panels, one on each side of the side wall panels at the ends of the blank, the top panels being adapted to be joined to form a composite wall, such top panels including hinged, chimed engaging tabs formed within the contour of the top panels and adapted when folded through 180° to contact flatwise the adjacent can ends with their edges in retaining relation to the chimes of the cans so contacted, such mechanism including, in combination, conveying means for advancing a flat blank of the type defined in a direction transverse to its length, means for displacing the chime engaging tabs in the top panels to project inwardly of the blank when in can enclosing position, means for delivering a group of two rows of chimed cans in upright, symmetrical arrangement on the central panel with the rows extending in the direction of blank travel, means acting as the blank, with cans thereon, advances for folding the side panels and attached top panels upward to bring the side panels against the sides of the can group, means acting thereafter as the blank advances for folding the top panels down to bring them into enclosing position, additional means acting concurrently with said top panel folding means for retaining the top panel tabs folded and movable to chime engaging and retaining position when the folded tabs are brought into contact with the can ends as the top panels are moved to final closed position.

7. Mechanism as defined in claim 6, which includes means, acting after the top panel tabs have been displaced, for prefolding such tabs through the remainder of 180 degrees into a position against their attached panels.

8. Mechanism as defined in claim 7, including means for joining the top panels.

9. In a mechanism for enclosing a group of chimed cans within an elongated, wrap-around blank of resilient paperboard of the type having a central panel, side wall panels on opposite sides of the central panel and top panels on each of the side wall panels at the ends of the blank, the central panel having hinged, chime retaining tabs formed within the contour of such panel adjacent its free edges, the combination of a base frame, conveying means on the frame for advancing an unfolded blank of the type defined in a direction transverse to its length, means for displacing the hinged retaining tabs upwardly of the blank, mechanism for loading upright chimed cans onto the central panel of the blank, such mechanism comprising a curved can guide means on the base frame, a starwheel mounted on the frame adjacent the guide means to rotate on a vertical axis, such guide means and star wheel being disposed over the path of the central panel of the unfolded blank, the starwheel being formed with peripheral notches to propel cans between the guide means and starwheel, a disk mounted below the starwheel to support cans held between the starwheel and guide means, the blank conveying means being positioned relative to the disk to convey blanks a slight distance below the plane of the disk, the edge of the disk being spaced over the path of the blank and adjacent the line of travel of the upwardly displaced tabs, means for delivering cans within the starwheel notches, means for driving the conveying means, means for rotating the starwheel in timed relation with the blank conveying means, whereby selected cans carried by the starwheel will travel adjacent to and bear against the upraised retaining tabs which are to retain such cans, and a can engaging cam-guide means fixed on the base frame having a part in overlapping relation to the starwheel and disk adapted as the cans are propelled by the starwheel, to force the cans out of the notches against the upraised tabs and off the disk to transfer the cans from the disk to the central panel of the blank, thus causing cans, moving against upraised retaining tabs, to be deposited upon the blank with their chime edges confining such tabs and with the tabs folded over 180° from their original position within the central panel.

10. A mechanism as defined in claim 9, in which the conveying means includes lugs for propelling the blanks, and separate, upstanding lugs for engaging the trailing cans delivered to the central panel of the blanks, said can engaging lugs being positioned with respect to the blank engaging lugs to assure accuracy of engagement of the chime engaging tabs with the can chimes.

References Cited by the Examiner
UNITED STATES PATENTS

| | | | |
|---|---|---|---|
| 2,685,993 | 8/54 | Currivan | 53—48 X |
| 2,900,772 | 8/59 | Chidsey et al. | 53—48 |
| 2,974,454 | 3/61 | Andre et al. | 53—48 X |
| 3,016,663 | 1/62 | Holmes et al. | 53—48 X |
| 3,060,659 | 10/62 | Blais et al. | 53—48 X |

FRANK E. BAILEY, *Primary Examiner.*

TRAVIS S. McGEHEE, *Examiner.*